(12) United States Patent
Younger

(10) Patent No.: US 9,418,571 B2
(45) Date of Patent: Aug. 16, 2016

(54) APPARATUS AND METHOD FOR TRAINING MOVEMENTS TO AVOID INJURIES

(71) Applicant: Terry I. Younger, Barrington, IL (US)

(72) Inventor: Terry I. Younger, Barrington, IL (US)

( * ) Notice: Subject to any disclaimer, the term of this patent is extended or adjusted under 35 U.S.C. 154(b) by 147 days.

(21) Appl. No.: 14/087,905

(22) Filed: Nov. 22, 2013

(65) Prior Publication Data

US 2015/0147733 A1 May 28, 2015

(51) Int. Cl.
*G09B 19/00* (2006.01)

(52) U.S. Cl.
CPC .................................. *G09B 19/003* (2013.01)

(58) Field of Classification Search
CPC .................... G09B 19/0098; A63B 2024/0009
USPC ......................................................... 434/247
See application file for complete search history.

(56) References Cited

U.S. PATENT DOCUMENTS

| | | |
|---|---|---|
| 4,538,595 A | 9/1985 | Hajianpour |
| 4,667,685 A | 5/1987 | Fine |
| 4,883,069 A | 11/1989 | McLeod |
| 5,280,265 A | 1/1994 | Kramer et al. |
| 5,474,088 A | 12/1995 | Zaharkin et al. |
| 6,296,595 B1 | 10/2001 | Stark et al. |
| 6,436,058 B1 | 8/2002 | Krahner et al. |
| 7,048,704 B2 | 5/2006 | Sieller et al. |
| 7,507,215 B2 | 3/2009 | Ryan |
| 7,662,122 B2 | 2/2010 | Sterling |
| 7,993,291 B2 | 8/2011 | Karkanias et al. |
| 8,025,632 B2 | 9/2011 | Einarsson |
| 8,291,779 B2 | 10/2012 | Helmer et al. |
| 8,317,730 B2 | 11/2012 | Zhang et al. |
| 8,333,722 B2 | 12/2012 | Ewing |
| 2002/0143279 A1 | 10/2002 | Porier et al. |
| 2006/0166737 A1* | 7/2006 | Bentley ................. A61B 5/1122 463/30 |
| 2009/0024062 A1* | 1/2009 | Einarsson .......... A41D 13/1281 600/595 |
| 2009/0210078 A1* | 8/2009 | Crowley ................ G06Q 30/02 700/91 |

(Continued)

FOREIGN PATENT DOCUMENTS

| | | |
|---|---|---|
| WO | WO 01/49235 A2 | 7/2001 |
| WO | WO 2005/018453 A1 | 3/2005 |

OTHER PUBLICATIONS

Postma, WF et al., "Anterior Cruciate Ligament Injury-Prevention Programs," J Bone Joint Surg Am., 2013, vol. 95, pp. 661-669.

(Continued)

*Primary Examiner* — Robert J Utama
*Assistant Examiner* — Sadaruz Zaman
(74) *Attorney, Agent, or Firm* — Pauley Erickson & Kottis

(57) ABSTRACT

This invention is directed to an apparatus and method for training a user, such as an athlete, a performer and/or any other suitable person, how to avoid injuries to the body, particularly so that there is no need for rehabilitation of an injured body part. At least two parameters of performance are compared to each other and/or to given data or other information, for example information taken from a database. For example, the at least two parameters can include two different distances that are measured and compared with respect to each other. A computer or other processor can run algorithms and/or any other suitable functions to calculate how the user should make a next movement in an accident avoidance training session. One or more next movements can be communicated in a wired manner, a wireless manner and/or any other suitable communication manner. The next movement can be displayed on a graphical user interface device and/or on any other suitable display.

24 Claims, 2 Drawing Sheets

(56) References Cited

U.S. PATENT DOCUMENTS

| | | | |
|---|---|---|---|
| 2010/0125229 A1 | 5/2010 | Rudolph et al. | |
| 2011/0152736 A1 | 6/2011 | Ng | |
| 2011/0270135 A1* | 11/2011 | Dooley | A61B 5/1121 600/595 |
| 2011/0312473 A1* | 12/2011 | Chu | A63B 22/0292 482/54 |
| 2012/0238914 A1 | 9/2012 | Goldfield et al. | |
| 2013/0012795 A1* | 1/2013 | Moenning | A61F 5/055 600/340 |
| 2013/0131554 A1 | 5/2013 | Dunias et al. | |
| 2013/0244211 A1* | 9/2013 | Dowling | G06F 19/3481 434/247 |
| 2014/0134584 A1* | 5/2014 | French | G09B 19/0038 434/247 |

OTHER PUBLICATIONS

Wright, RW et al., "Anterior Cruciate Ligament Revision Reconstruction: Two-Year Results From the Moon Cohort," J Knee Sur., Oct. 2007, vol. 20, pp. 308-311.

Wright, RW et al., "Descriptive Epidemiology of the Multicenter ACL Revision Study (MARS) Cohort," Am J Sports Med, Oct. 2010, vol. 38 (10), pp. 1979-1986 (Abstract Only).

Kaeding, CC et al., "Allograft Versus Autograft Anterior Cruciate Ligament Reconstruction: Predictors of Failure From a Moon Prospective Longitudinal Cohort," Sports Health, Jan. 2011, vol. 3 (1), pp. 73-81 (Abstract Only).

Myklebust, G et al., "Prevention of Noncontact Anterior Cruciate Ligament Injuries in Elite and Adolescent Female Team Handball Athletes," Instr. Course Lect., 2007, vol. 56, pp. 407-418 (Abstract Only).

Stop Sports Injuries, http://www.stopsportsinjuries.org/, Accessed Jan. 1, 2013 (2 pages).

Hardin, PhD, E et al., "Walking After Incomplete Spinal Cord Injury Using an Implanted FES System: A Case Report," J Rehabilitation Research & Development, 2007, vol. 44, No. 3, pp. 333-346.

Kobetic, MS, R et al., "Development of Hybrid Orthosis for Standing, Walking, and Stair Climbing After Spinal Cord Injury," J Rehabilitation Research & Development, 2009, vol. 46, No. 3, pp. 447-462.

Yakimovich, MASc, T et al., "Engineering Design Review of Stance-Control Knee-Ankle-Foot Orthoses," Rehabilitation Research & Development, 2009, vol. 46, No. 2, pp. 257-268 (cited as), pp. 257-267 (actual).

* cited by examiner

APPARATUS AND METHOD FOR TRAINING MOVEMENTS TO AVOID INJURIES

BACKGROUND OF THE INVENTION

1. Field of the Invention

This invention relates to an apparatus and method for training a user, such as an athlete or a performer, how to move different parts of its body to prevent or avoid injuries to the body, particularly so that there is no need for rehabilitation of an injury.

2. Discussion of Related Art

Many conventional apparatuses and methods use orthopedic devices to rehabilitate an injured limb or other body part. Some injuries require no surgery while other injuries require surgery. Some elective surgeries result in an injured limb or other body part that requires rehabilitation. Known rehabilitation devices are used to strengthen, repair or return to normal a limb or other body part that is already injured. Known rehabilitation apparatuses and methods are not used to train a person how to avoid an injury, because the injury has already occurred.

Some conventional rehabilitation devices include restraints or brace structures, such as an orthopedic restraining device, that are secured to one or more limbs of the patient. Conventional rehabilitation devices include programmed rehabilitation protocols that can be used through a display device to instruct the patient how to perform rehabilitating exercises, and also can store data relating to performance information showing how the patient is progressing through the rehabilitation process.

SUMMARY OF THE INVENTION

There is an apparent need for a training apparatus and method that can be custom modified, particularly in real time, to learn or assess movements of a particular user, compare the learned movements to one or more sets of preferred or desired movements, and then teach or instruct the user how to train certain body movements of the user, all to avoid injuries and thus the need to rehabilitate an injured limb or other body part. According to some embodiments of this invention, the apparatus and method are used to train, instruct or otherwise teach the user, such as an athlete, a performer and/or a child, how to move a pre-injured body part, such as a knee, an ankle and/or another body limb, in movement patterns that prevent injuries.

In some embodiments of this invention, the training device measures and assesses performance of an exercise routine by the user. The measured performance can be compared to any one or more sets of data or information. For example, the measured performance parameters can be compared to a library of given information sets, such as parameters that are preferred or recommended by an instructor, a therapist and/or a physician. As another example, the measured performance parameters can be compared to historical information sets for a particular user. As still another example, the measured performance parameters can be compared to relative movements of the limb or to one or more other body parts. For example, movements of a left knee can be compared to movements of a right knee and/or movements of one particular bone or joint or other body part can be compared to itself. Any comparison can occur either instantaneously or over a given time period, and thus can provide instantaneous feedback and real time instruction to the user.

In some embodiments of this invention, one or more user movements are compared to a library or other database of fixed and/or variable data or information. In other embodiments of this invention, movements of one body part are compared to historical and/or instantaneous movements of that same body part, over a given time period, to provide a real time feedback to the user. With real time feedback, the user can immediately or instantaneously modify one or more of the user's next movements, such as in a training sequence or a training protocol, particularly to train or learn how to move body parts to avoid or prevent injuries.

In some embodiments of this invention, two or more sensors are used to determine a position and a relative position of the limb and/or the other body part, and communicate signals to a processor. In some embodiments of this invention, the processor compares, assesses and/or calculates the next physical movement of the user, so that the user can train or learn how to move the limb or other part of the body to avoid injuries. In some embodiments of this invention, the next physical movement that the user should make is communicated as a signal to a display, an interactive device and/or a graphical user interface, such as of an electronic device.

The training apparatus and method of this invention can be used to improve training techniques and to adhere to training protocols, particularly those that prevent injuries and thus avoid the need for rehabilitation.

BRIEF DESCRIPTION OF THE DRAWINGS

The above and other features of this invention become more apparent when the specification is taken in view of the drawings, wherein.

DETAILED DESCRIPTION OF THE INVENTION

The training apparatus and method of this invention can be used to train a person, such as an athlete or a performer, how to move at least a portion of its body, particularly in a manner which avoids injuries. As used throughout this specification and in the claims, the terms exertional activity, simulated activity, simulated sport activity and/or sport specific activity are all intended to be interchangeable with each other and relate to one or more movements through which the person or the user progresses when training for and/or participating in an event, such as a sporting event or a performance. Also as used throughout this specification and in the claims, the terms train and training are intended to be interchangeable with each other and relate to teaching the user how to make physical movements and/or movement protocols, for example during pre-injury and/or pre-surgery times, to avoid an injury and/or surgery, and are intended to be different from and not related to or encompassed by the terms rehabilitate and rehabilitation which is an event that occurs after an injury and/or surgery, or during a post-injury and/or post-surgery time.

In some embodiments of this invention, an apparatus and method for training a particular user how to move at least a portion of its body includes sensing at least one position of the body and communicating each position to a computer or other suitable processor. Each position is then compared, calculated and/or processed and communicated back to the user as a training program and/or a training protocol which the user can then view as computed results, such as on a display or a graphical user interface (GUI) of an electronic device. The apparatus and method of this invention can provide the user with real time feedback that allows the user to instantaneously or immediately change or modify an exercise routine and/or another similar routine, particularly in an effort to avoid injuries to any limb or other body part.

Figure 1:
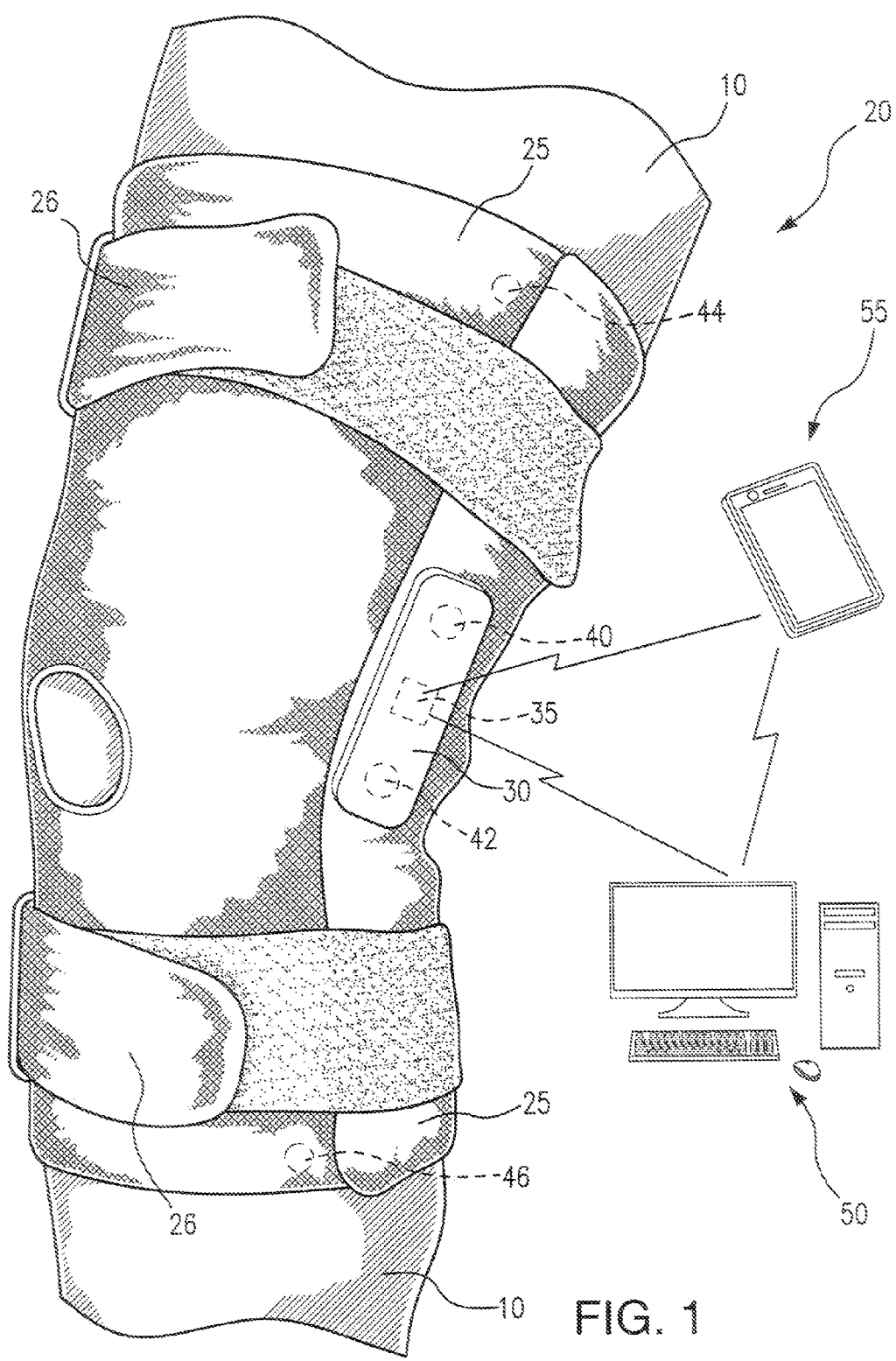
FIG. 1 is a front perspective view of a training apparatus, according to one embodiment of this invention.
Figure 2:
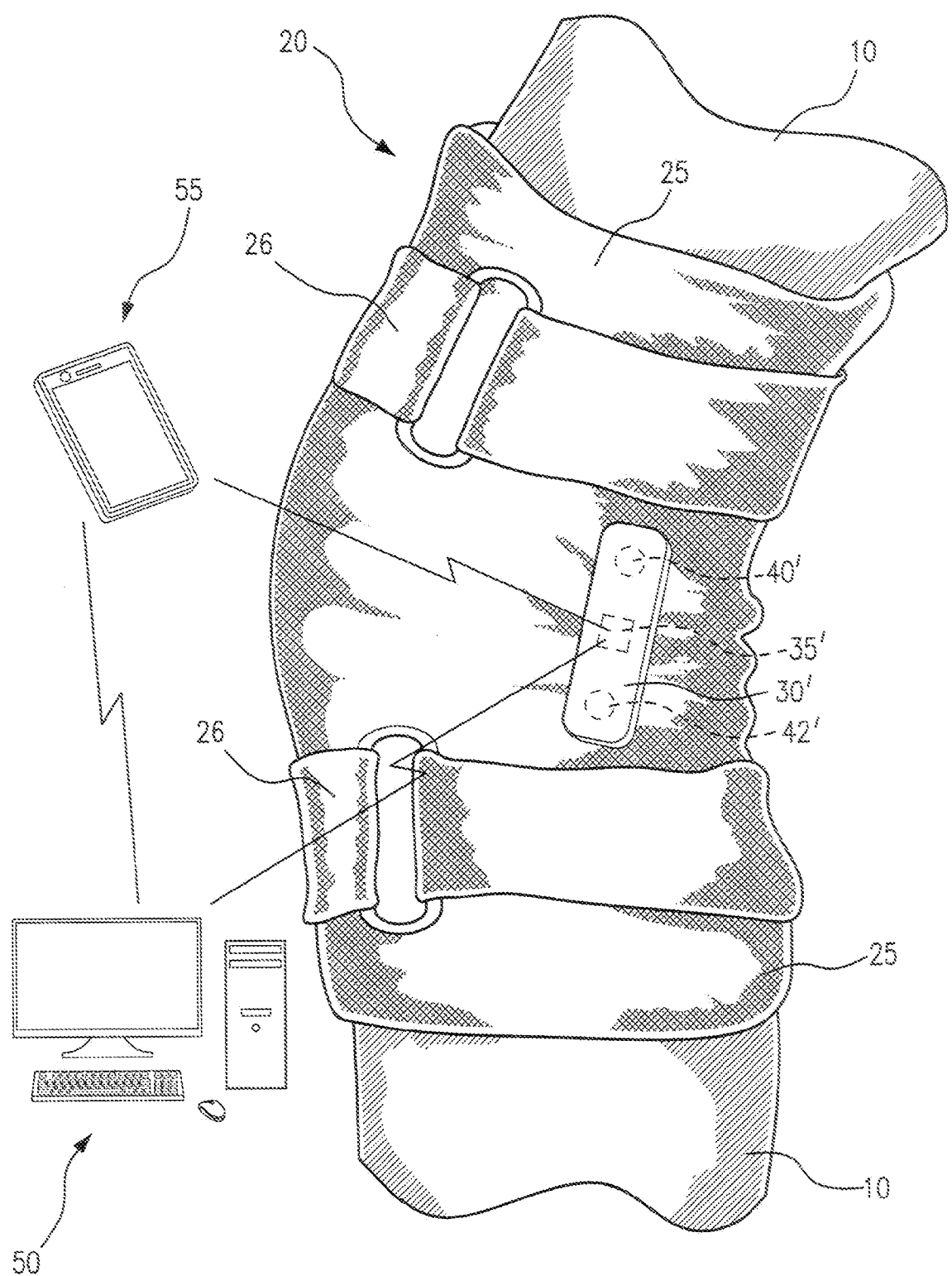
FIG. 2 is a rear perspective view of the training apparatus, as shown in FIG. 1.

FIGS. 1 and 2 show element reference 10 as a limb or other body part of a body of the user. As used throughout this specification and in the claims, the terms limb, body and body part are intended to be interchangeable with each other and relate to at least a portion of the body of the user.

In some embodiments of this invention, the apparatus or device of this invention comprises a brace 20, including but not limited to a limb or knee brace, which is shown in FIGS. 1 and 2 as mounted about a knee area of the user. In other embodiments of this invention, the brace 20 can be mounted about and/or detachably fixed with respect to any other body part of the user. In some embodiments of this invention, a housing 30 is attached or otherwise secured, directly and/or indirectly, to or with respect to the limb 10. A more secure fit with little or no play can result in increased accuracy in determining the precise position of the limb 10 at any given time, for example, because the relative position of the housing 30 and thus each position sensor does not move, or moves relatively little, with respect to a given point or area on the limb 10.

In some embodiments of this invention, the brace 20 and/or elements within the housing 30 can be used to monitor, track, record, analyze and/or otherwise process relative movements of the limb 10 and/or any other body part, and thus train or teach the user how to move. According to some embodiments of this invention, the relative movements of the user can be processed and then communicated to the user, for example for training and/or exercise therapy movements, to help the user avoid injuries. In other embodiments according to this invention, it is possible to train the user how to move after a surgical operation or after surgery has occurred, for example, after a particular user has a replaced knee.

In some embodiments of this invention, the apparatus or device measures a performance of an exercise routine and then analyzes, calculates and/or otherwise processes the measured parameters and communicates and/or provides output information, for example, how to change or improve the training or the other exercise protocol.

In some embodiments of this invention, the apparatus or device can be made of a relatively soft and flexible material, such as a support structure 25 shown in FIGS. 1 and 2. In some embodiments, straps or belts 26 are used to tighten and secure the support structure 25 with respect to the limb 10. Any other suitable device, structure and/or material can be used to secure the housing 30 directly to or with respect to the limb 10.

In other embodiments of this invention, the support structure 25 can be of a relatively rigid and/or more durable material and/or structure. One example of the user of the apparatus and method of this invention, which is used for training purposes and not rehabilitation purposes, includes a basketball player training how to move its body during a particular jump so that the takeoff and landing of the jump are executed without applying damaging forces to and thus injuring bones, knees, cartilages and/or any other injury-prone body part.

Another example of the user of the apparatus and method of this invention includes a person training how to move to jump over and avoid an obstacle, such as a track runner training or learning to run and jump over and avoid a hurdle, without applying damaging takeoff and landing forces to and thus injuring any body part. In many different embodiments of this invention, a processor 35 calculates a recommended value, for example as a function of one or more measured parameters, and communicates the recommended value to the user for modifying the next movement of the user, for example, to prevent injuries to the body of the user. In some embodiments according to this invention, the recommended value is communicated to a display 55, for example, a remote smart device, such as a smart phone, a smart tablet, a graphical user interface (GUI), a gaming device and/or any other suitable device for displaying and/or animating the recommended value as an image that the user can understand and/or manipulate. In other embodiments of this invention, the recommended value can be further modified so that the user can interact with and/or play with the recommended value as it appears on any suitable display, for example, by earning points in an electronic game as a result of correctly or successfully training for the next move of the body. These types of plays or interactions between the user and the display 55 can add enjoyment to movement training techniques for injury avoidance.

In some embodiments of this invention, the apparatus comprises medial and lateral hinges and metal supports. One or more sensors can be positioned, located or placed at a proximal end and/or a distal end of medial and/or lateral sides of the support structure 25 and/or the housing 30. In some embodiments, such as shown in FIG. 1, a first sensor 40 is secured with respect to the limb 10 and detects and then transmits a first position and a second sensor 42 is secured with respect to the limb 10 and detects and then transmits a second position of the housing and/or the support structure 25 to a receiver 50 and/or other processor 35. For example, the processor 35 or other computer, such as of the receiver 50, can calculate the relative distances between the first position of the first sensor 40 and the second position of the second sensor 42, and then recommend, deliver, command and/or output a value or a signal that corresponds to a next movement, a set of movements and/or an exercise routine, for example, to correct and/or enhance any one or more prior training exercise routines. The processor 35 and/or the receiver 50 or other computer can store information, such as past movements or exercise routines, for example in a memory. In other embodiments of this invention, one or more sensors 40, 42, 44 and/or 46 can be used to detect positions and/or forces being applied to the support structure 25 by the user and/or can detect other parameters associated with how the user is moving the housing 30 and/or the support structure 30.

In some embodiments of this invention, a measuring device is connected to the housing 30 and/or the support structure 25 or brace, for example, to measure flexion, extension, varus angles, valgus angles and/or rotation of a knee. FIGS. 1 and 2 show the housing 30 fixed or otherwise secured, directly or indirectly, to the support structure 25, such as with a fastener, an adhesive and/or an adhesive element, including but not limited to an adhesive tape or suitable adhesive or fastener. In other embodiments of this invention, the housing 30 can be fixed or otherwise secured in any other suitable mechanical, structural and/or magnetic manner directly to or with respect to the support structure 25 and/or the limb 10.

The first sensor 40, the second sensor 42 and/or any other suitable sensor, such as shown in FIG. 2, can be fixed or otherwise attached directly to the housing 30 and/or away from the housing 30. FIG. 1 shows a third sensor 44 and a fourth sensor 46 fixed or otherwise attached with respect to the support structure 25, which in some embodiments of this invention can be interchanged with or used in addition to the first sensor 40 and/or the second sensor 42. Using more sensor can provide more input values and thus increased overall accuracy of the apparatus and the method of this invention. In some embodiments of this invention, two sensors are needed to provide a relative difference in a particular parameter, such as a distance between or from each other, so that the processor 35 or other computer can compare and analyze one sensor with respect to or relative to the other sensor.

In some embodiments of this invention, any one or more of the sensors 40, 42, 44 and 46 can be fixed and/or secured directly or indirectly to the limb 10, such as with an adhesive or by using another attachment. FIG. 2 shows another housing 30' which can be used in combination with or in lieu of the housing 30 as shown in FIG. 1. Likewise, the first sensor 40', the second sensor 42' and/or the processor 35' can be used in addition to or in place of the elements shown on the housing 30 in FIG. 1. In some embodiments, using more sensors results in increased accuracy in detecting the instantaneous and/or timed movement of the limb 10.

In some embodiments, the device of this invention has the computer or other processor 35 that transmits, in a wired manner and/or a wireless manner such as indicated by the lightning bolt lines in FIGS. 1 and 2, processed data to the receiver 50 and/or the display 55, such as a smart phone or a smart tablet, to deliver, provide and/or give instructions and/or information, for example, regarding performance of the limb 10 and/or any other function used to vary and/or recommend the exercise routine and/or other or next movement of the user. The instructions and/or information can be stored in a database and/or a computer of the receiver 50 and/or the processor 35 and then, for example, communicated to and incorporated into exercise programs to improve compliance with knee ligament protection protocols. In some embodiments of this invention, the instructions and/or information can be combined with a training program, for example a training program that can be interacted with and/or played as a game on the receiver 50, the display 55 and/or any other local device, remote device and/or another suitable display or electronic gaming console.

In some embodiments of this invention, the support structure 25 comprises a brace with two or more attached sensors 40, 42, 44, 46, for example that detect relative positions, and rigid or metal supports, with or without hinges, that can be used, for example with patients that have arthritis with varus deformity conditions. In some embodiments of this invention, the support structure 25 can monitor a position of the limb 10 and then use a mover, a pusher, a puller and/or any other suitable movable structural device to exert a force to the support structure 35, for example to deliver a counterforce to a deformity of an arthritic knee. The force and/or counterforce can be generated using any suitable mechanical mover or other device that manually and/or automatically delivers a specified force, such as in an intermittent and/or customized manner, for example to vary the deformity of the knee or any other suitable limb.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A method for training a user how to move at least a portion of a body of the user, including the steps of:
   placing a brace on a first part of the body, the brace including a first sensor at a first position and a second sensor at a second position spaced apart from the first sensor;
   sensing with each of the first sensor and the second sensor a first position of the first part of the body and communicating the first position to a processor;
   sensing with each of the first sensor and the second sensor a second position of the first part and communicating the second position to the processor;
   the processor comparing at least one first parameter corresponding to the first position with respect to at least one second parameter corresponding to the second position; and
   the processor comparing the at least one first parameter to the at least one second parameter and
   providing a feedback to the user for modifying a next movement of the body to prevent an injury to the body.

2. The method according to claim 1, wherein the first sensor and the second sensor are fixed with respect to a first housing positioned at the first part of the body and at least one third sensor is fixed with respect to a second housing positioned at a second part of the body.

3. The method according to claim 2, wherein during movement of the body over a time period, the processor compares the at least one first parameter to the at least one second parameter and determines the feedback.

4. The method according to claim 1, wherein the processor communicates the feedback as processed data to a receiver or to a display of a device.

5. The method according to claim 1, wherein the feedback instructs the user how to make the next movement to train the at least a portion of the body to prevent the injury to the body.

6. The method according to claim 1, wherein the feedback is communicated to a display device that displays an image showing the user how to make the next movement to prevent the injury.

7. The method according to claim 6, wherein the image appears on the display device of a gaming console.

8. The method according to claim 1, wherein the processor calculates the next movement as a function of the at least one first parameter and the at least one second parameter and emits the feedback to a display.

9. The method according to claim 1, wherein the feedback is communicated to a remote smart device and the next movement is displayed on the remote smart device.

10. The method according to claim 1, wherein the user is an athlete that uses the next movement to train how to move the body to prevent the injury.

11. The method according to claim 1, wherein the processor communicates the feedback to a graphical user interface (GUI) of an electronic device.

12. The method according to claim 11, wherein the graphical user interface displays the next movement or a training movement in real time.

13. A method for training a user how to avoid an injury to at least a portion of a body of the user, including the steps of:
   fixing a brace on a first part of the body, positioning a first sensor at a first position on the brace and positioning a second sensor at a second position on the brace which is at a distance from the first position;
   moving the first part of the body, the first sensor and the second sensor and during a time period sensing and communicating to a processor a first parameter at a first time of the first part of the body and a second parameter at a second time of the first part of the body; and
   the processor comparing the first parameter to the second parameter and providing a feedback to a display device and displaying an image on the display device for training the user how to make a next movement of the body to prevent the injury to the body.

14. The method according to claim 13, wherein the feedback is communicated to a remote smart device and the next movement is displayed on the remote smart device.

15. The method according to claim 13, wherein the display device is a graphical user interface (GUI) of an electronic device.

16. The method according to claim 13, wherein the display device displays the feedback as a training movement in real time.

17. A method for training a user how to avoid an injury to a body of the user, including the steps of:

fixing a brace on a first part of the body, positioning a first sensor at a first position on the brace and positioning a second sensor at a second position on the brace which is at a distance from the first position;

moving the first part of the body, the first sensor and the second sensor and during a time period sensing and communicating to a processor at least two parameters of the first part of the body different from each other and corresponding to a first time and a second time different from the first time of the first part of the body; and the processor comparing the at least two parameters to each other and providing a feedback to a display device showing an image that trains the user how to make an exertional activity movement of the body to prevent the injury to the body.

18. The method according to claim 17, wherein the feedback is communicated to a remote smart device and the exertional activity movement is displayed on the remote smart device.

19. The method according to claim 17, wherein the display device is a graphical user interface (GUI) of an electronic device.

20. The method according to claim 17, wherein the display device displays the feedback as a training movement in real time.

21. The method according to claim 1, further comprising the processor communicating the feedback to an exercise program or a training program and the user interacting with the feedback through a display or an electronic gaming console.

22. The method according to claim 1, further comprising a mechanical mover processing the feedback and generating a force or a counterforce to act on the brace.

23. The method according to claim 1, further comprising sensing with each of a third sensor and a fourth sensor the first position and the second position and communicating the first position and the second position to the processor.

24. The method according to claim 1, further comprising modifying the feedback and the user interacting with or playing with the feedback appearing on a display.

* * * * *